(12) United States Patent
Ye et al.

(10) Patent No.: US 9,924,563 B2
(45) Date of Patent: Mar. 20, 2018

(54) METHOD, SYSTEM AND MEDIA GATEWAY FOR REALIZING MOBILE SWITCH CENTER POOL

(75) Inventors: Sihai Ye, Shenzhen (CN); Xiaochun Cui, Shenzhen (CN); Bei Wang, Shenzhen (CN); Zhenhua Liu, Shenzhen (CN); Hualin Luo, Shenzhen (CN); Hao Zhang, Shenzhen (CN); Fudong Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1340 days.

(21) Appl. No.: 12/356,438

(22) Filed: Jan. 20, 2009

(65) Prior Publication Data
US 2009/0122743 A1 May 14, 2009

Related U.S. Application Data

(63) Continuation of application No. PCT/CN2007/001047, filed on Mar. 30, 2007.

(30) Foreign Application Priority Data

Jul. 21, 2006 (CN) .......................... 2006 1 0103400
Aug. 11, 2006 (CN) .......................... 2006 1 0115235

(51) Int. Cl.
*H04L 12/28* (2006.01)
*H04W 88/14* (2009.01)
(Continued)

(52) U.S. Cl.
CPC ........... *H04W 88/14* (2013.01); *H04W 24/04* (2013.01); *H04W 48/18* (2013.01)

(58) Field of Classification Search
CPC .... H04L 12/56; H04L 2012/56; H04W 88/14; H04W 88/16; H04W 88/18; H04W 92/00;
(Continued)

(56) References Cited

U.S. PATENT DOCUMENTS 6,118,768 A * 9/2000 Bhatia et al. .................. 370/254
6,434,140 B1 * 8/2002 Barany et al. ................ 370/352
(Continued)

FOREIGN PATENT DOCUMENTS

CN          1290459 A      4/2001
CN          1508992 A      6/2004
(Continued)

OTHER PUBLICATIONS

Decision on Grant of a Patent for Invention in corresponding Russian Application No. 2009106072 (Oct. 4, 2010).
(Continued)

*Primary Examiner* — Andrew Chriss
*Assistant Examiner* — Kenan Cehic (57) ABSTRACT

The disclosure provides a method for realizing a Mobile Switch Center (MSC) pool, a system for realizing an MSC pool and a Media Gateway (MGW). The method for realizing an MSC pool includes: connecting with a Base Station Controllers (BSC)/Radio Network Controller (RNC), by a Media Gateway (MGW) through the use of a common signaling point; and upon receipt of a message whose destination signaling point is the common signaling point from the BSC/RNC, determining, by the MGW, a destination MSC server of the message according to ID information carried in the message, and sending the received message to the destination MSC server. According to the present invention, the networking scheme for an MSC pool may be implemented without upgrading any BSC/RNC. The flexibility of the networking scheme for mobile communication systems may be improved, and the traffic load of the subscribers may be shared.

13 Claims, 5 Drawing Sheets

(51) Int. Cl.
*H04W 24/04* (2009.01)
*H04W 48/18* (2009.01)

(58) Field of Classification Search
CPC ..... H04W 92/12; H04W 92/14; H04W 92/16; H04W 92/22; H04W 92/24
USPC .......................................... 370/310–350, 389
See application file for complete search history.

(56) References Cited

U.S. PATENT DOCUMENTS

| | | | |
|---|---|---|---|
| 6,633,555 | B1 * | 10/2003 | Lin et al. ...................... 370/331 |
| 6,952,433 | B1 * | 10/2005 | Stumpert ............. H04Q 3/0025 370/360 |
| 7,668,147 | B2 * | 2/2010 | Lindsay ................ G10L 19/012 370/280 |
| 2002/0150084 | A1 * | 10/2002 | Lee ..................... H04W 76/022 370/352 |
| 2002/0187790 | A1 | 12/2002 | Papadimitriou et al. |
| 2003/0129991 | A1 * | 7/2003 | Allison et al. ................ 455/456 |
| 2004/0137904 | A1 | 7/2004 | Gradischnig |
| 2004/0248592 | A1 | 12/2004 | Turina et al. |
| 2006/0029076 | A1 * | 2/2006 | Namihira et al. ............ 370/392 |
| 2007/0091877 | A1 * | 4/2007 | Lundin et al. ................ 370/353 |
| 2008/0310404 | A1 * | 12/2008 | Valme et al. ................. 370/353 |

FOREIGN PATENT DOCUMENTS

| | | |
|---|---|---|
| CN | 1524389 A | 8/2004 |
| CN | 1545345 A | 11/2004 |
| EP | 1473950 A1 | 3/2004 |
| WO | WO 03/019958 A1 | 6/2003 |
| WO | WO 2004/047467 A1 | 6/2004 |
| WO | WO 2005/064954 A1 | 7/2005 |
| WO | WO 2008/080704 A1 | 7/2008 |

OTHER PUBLICATIONS

European Patent Office, European Search Report in EP Application No. 07720621.7 (dated Mar. 5, 2010).
Global System for Mobile Communications (GSM), "Digital Cellular Telecommunications System (Phase 2+); Universal Mobile Telecommunications System (UMTS); Intra-Domain Connection of Radio Access Network (RAN) Nodes to Multiple Core Network (CN) Nodes (3GPP TS 23.236 Version 6.3.0 Release 6)," ETSI TS 123 236 V6.3.0 (Mar. 2006).
Russian Patent Office, Examination Report in Russian Application No. 2009106072/09 (no date on Examination Report).
Australian Government IP Australia, Notice of Acceptance of Australian Patent Application No. 2007278687 (dated May 14, 2009).
Australian Government IP Australia, Patent Deed and Specification of Australian Patent Application No. 2007278687 (dated Sep. 10, 2009).
"3$^{rd}$ Generation Partnership Project; Technical Specification Group Services and System Aspects; Intra-domain connection of Radio Access Network (RAN) nodes to multiple Core Network (CN) nodes (Release 6)," 3GPP, TS 23.235 V6.3.0 (Mar. 2006).
Written Opinion in PCT Application No. PCT/CN2007/001047, dated Jul. 12, 2007.
First Office Action in Chinese Application No. 200610115235.0, dated Jul. 4, 2008.
Second Office Action in Chinese Application No. 200610115235.0, dated Jan. 9, 2009.

* cited by examiner

METHOD, SYSTEM AND MEDIA GATEWAY FOR REALIZING MOBILE SWITCH CENTER POOL

CROSS-REFERENCE TO RELATED APPLICATIONS

This application is a continuation of International Patent Application No. PCT/CN2007/001047, filed Mar. 30, 2007, which claims priority to Chinese Patent Application No. 200610103400.0, filed Jul. 21, 2006, and Chinese Patent Application No. 200610115235.0, filed Aug. 11, 2006, all of which are hereby incorporated by reference in their entirety.

FIELD OF THE INVENTION

The present invention relates to mobile communication technology, and more particularly, to a method and system for realizing a Mobile Switch Center (MSC) pool and a Media Gateway (MGW).

BACKGROUND

Figure 1:
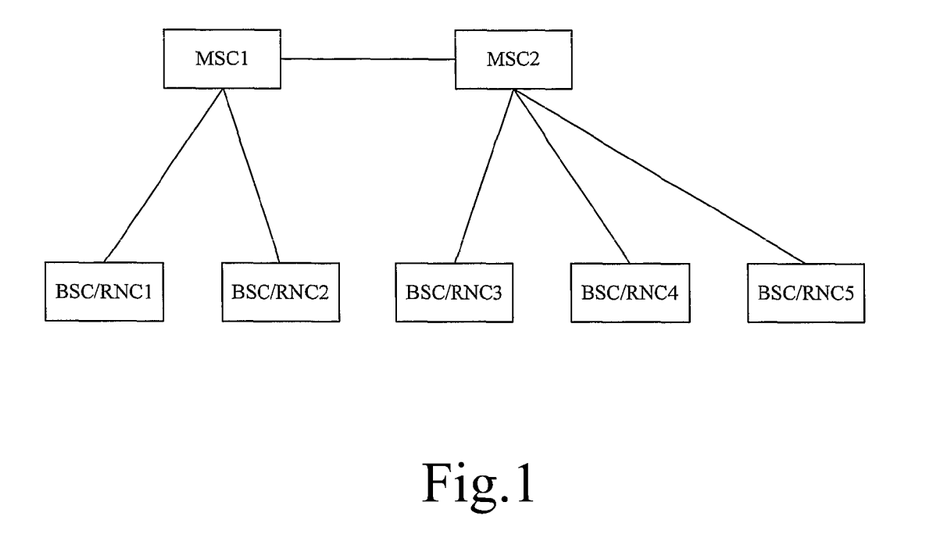
FIG. 1 shows the configuration of a conventional mobile communication network.

FIG. 1 shows the configuration of a conventional mobile communication network. In FIG. 1, one Mobile Switch Center (MSC) may be connected to several Base Station Controllers (BSCs) or Radio Network Controllers (RNCs), but one BSC/RNC can be connected to only one MSC. Such a one-to-many relationship between MSC and BSC/RNC limits the networking scheme to some extent. For example, when MSC1 carries the load of local subscribers only, MSC1 may be designed to have a small capacity during the network plan phase. However, considering a case in which many subscribers registered in MSC2 might flock into the service area of MSC1 in a certain time period, MSC1 should be designed to have a large capacity. Thus, it can be seen that the networking scheme of conventional mobile communication networks is not flexible enough and the network plan is complicated, which tends to cause an increase in the investment costs of the network devices.

Figure 2:
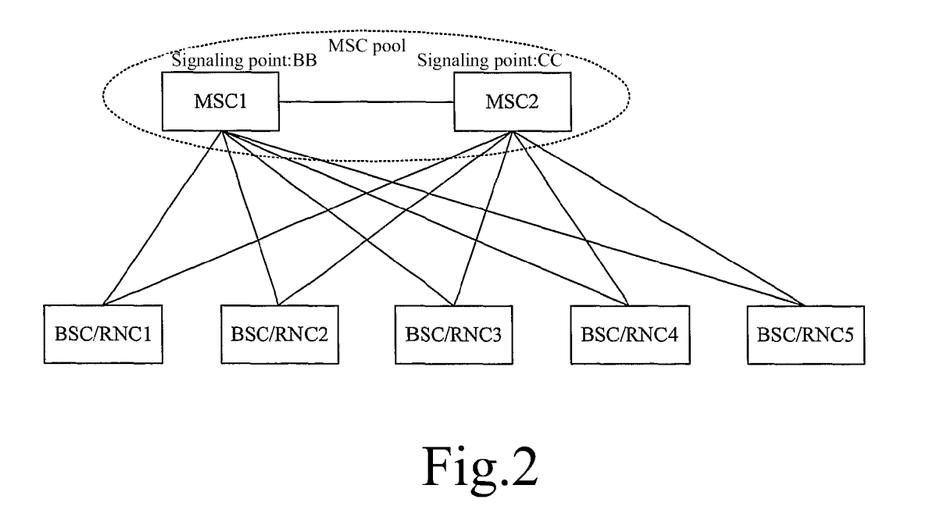
FIG. 2 shows the configuration of a mobile communication network based on an MSC pool.

To address the above problem, a networking scheme for implementing an MSC pool is proposed in the 3GPP 23.236 protocol. FIG. 2 shows the configuration of a mobile communication network based on an MSC pool. In FIG. 2, one MSC may be connected to several BSCs/RNCs, and one BSC/RNC may be connected to several MSCs too, in which the MSCs constitute an MSC pool with respect to the BSC/RNC. In this network configuration, the load of a BSC/RNC may be shared among several MSCs in the MSC pool. Thus, problems caused by the configuration of the conventional mobile communication networks, for example, complicated network plan and increase in the investment costs of the network devices, may be avoided. For instance, when many subscribers registered in MSC2 swarm into the service area of MSC1, MSC2 may still carry the traffic of these subscribers and MSC1 may only carry the load of the local subscribers because the BSCs/RNCs within the service area of MSC1 are connected to MSC2 too. Therefore, there is no need to design a large capacity for MSC1.

Figure 3:
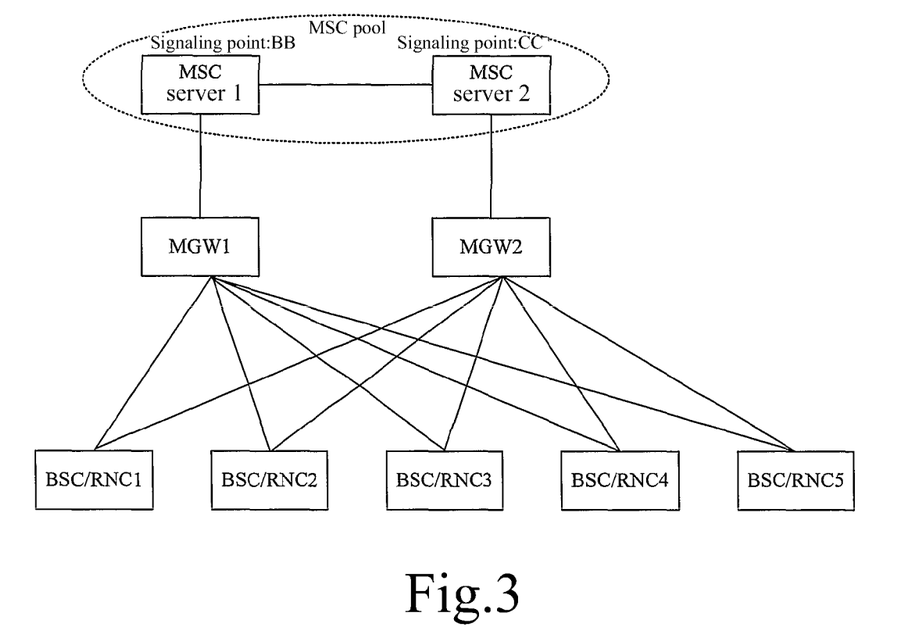
FIG. 3 shows the configuration of an existing MSC pool in which carrying and controlling are separated.
Figure 4:
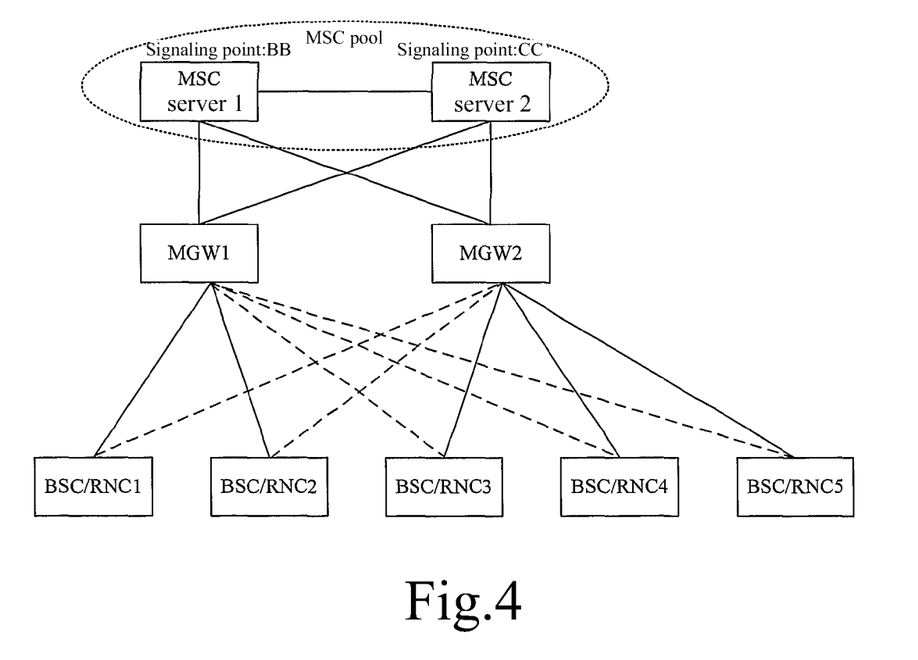
FIG. 4 shows the configuration of another existing MSC pool in which carrying and controlling are separated.

Alternatively, an MSC in the MSC pool may employ a structure in which the carrying function and the controlling function are separated, that is, the MSC may be divided into two parts: an MSC server and a media gateway (MGW). Here, the BSCs/RNCs may implement a full interconnection with the MSC servers in the MSC pool via a full interconnection with the MGWs, as shown in FIG. 3, or implement a full interconnection with the MSC servers in the MSC pool directly without the MGWs. Furthermore, a full interconnection between the BSCs/RNCs and the MSC servers in the MSC pool may be implemented through a full interconnection between the MGWs and the MSC servers in the MSC pool, as shown in FIG. 4.

In the existing networking scheme for an MSC pool, each MSC in the MSC pool has a different signaling point, and thus, a BSC/RNC has to support connection with multiple signaling points so as to identify different MSCs. In traffic processing, a BSC/RNC selects a serving MSC for a mobile station (MS) according to the subscriber ID/Intra-Domain NAS node selection (IDNNS) parameter. For example, upon receipt of a layer 3 service request/initial direct transfer message from the MS, the BSC/RNC parses the subscriber ID/IDNNS parameter information in the layer 3 service request/initial direct transfer message, and allocates the traffic load of the subscribers among the MSC servers in the MSC pool according to the subscriber ID/IDNNS parameter.

It can be seen that in the existing 3GPP 23.236 protocol, a BSC/RNC has to support the MSC pool function provided in the protocol, establish a signaling connection with each different signaling point (i.e. MSC) and implement distribution of the subscriber traffic load, so as to implement the network scheme of the MSC pool. However, BSC/RNCs in the current networks do not support such a function now. In other words, all BSC/RNCs in the current networks have to be upgraded if the networking scheme for the MSC pool is to be supported. Considering the fact that there are a large number of BSC/RNCs in the current networks and different manufacturers have inconsistent plans for the BSC/RNCs to support the MSC pool, it would be very difficult to upgrade the BSC/RNCs in the current networks and the upgrading cost is very high, and the upgrading will influence the services of the current networks greatly.

SUMMARY

Accordingly, a main object of the present invention is to provide a method and system for realizing a Mobile Switch Center (MSC) pool and to provide a Media Gateway (MGW), which may implement the networking scheme of the MSC pool without upgrading the BSCs/RNCs.

To fulfill the above object, a method for realizing an MSC pool according to an embodiment of the present invention is as follows:

connecting, by a Media Gateway (MGW) through a common signaling point, with a Base Station Controllers (BSC)/Radio Network Controller (RNC); and upon receipt of a message whose destination signaling point is the common signaling point from the BSC/RNC, determining, by the MGW, a destination MSC server of the message according to Identification (ID) information carried in the message, and sending the received message to the destination MSC server.

Here, the MSC server in the MSC pool establishes a signaling connection with the BSC/RNC through the common signaling point or a signaling point different from the common signaling point, and the MGW provides a signaling point different from the common signaling point to connect with the MSC server.

The message is a Layer 3 service request message, and the determining, by the MGW, the destination MSC server of the message according to the ID information carried in the message, includes: parsing, by the MGW, a subscriber ID from the Layer 3 service request message, and determining the destination MSC server of the message according to the subscriber ID.

The subscriber ID is a Temporary Mobile Subscriber ID (TMSI), and the determining, by the MGW, the destination MSC server of the message according to the subscriber ID, includes:

extracting, by the MGW, a Network Resource Indication (NRI) from the TMSI and determining the destination MSC server of the message according to a correspondence relationship between the NRI and an MSC server.

The Layer 3 service request message is a paging response message, and the subscriber ID is an International Mobile Subscriber ID (IMSI), and the determining, by the MGW, the destination MSC server of the message according to the subscriber ID, includes:

determining, by the MGW, the destination MSC server of the message according to a temporarily saved correspondence relationship between an IMSI and an MSC server; or inquiring, by the MGW, MSC servers in the MSC pool for an MSC server in which the subscriber resides, with the IMSI as the parameter, and using the inquired MSC server as the destination MSC server.

The subscriber ID is an IMSI or International Mobile Equipment ID (IMEI); and the determining, by the MGW, the destination MSC server of the message according to the subscriber ID, includes:

computing, by the MGW, a value V from the IMSI or IMEI, and determining the destination MSC server of the message according to a correspondence relationship between the value V and an MSC server.

The message is a non-CR message in SCCP uplink connection oriented messages, and determining, by the MGW, the destination MSC server of the message according to ID information carried in the message includes:

parsing, by the MGW, an MSC server ID from a destination SCCP connection number of the non-CR message, and determining the destination MSC server of the message according to a correspondence relationship between the MSC server ID and an MSC server.

The method further includes: carrying, by the MSC server, a home MSC server ID in an SCCP downlink connection oriented message.

The MSC server ID is carried in a source SCCP connection number of the message.

The method further includes:

upon receipt of a message sent from the MSC server, parsing, by the MGW, an SCCP layer message therein; and if the received message is an SCCP downlink connection oriented message, forwarding the received message to the BSC/RNC directly; if the received message is an SCCP downlink connectionless message, parsing the Layer 3 message therein; and when the Layer 3 message is a paging message and its subscriber ID is an IMSI, saving, by the MGW, a correspondence relationship between the IMSI and the MSC server temporarily.

Before the MGW determines the destination MSC server of the message according to the ID information carried in the message, the method further includes:

determining, by the MGW, whether a BSC/RNC corresponding to the source signaling point carried in the message is a BSC/RNC which needs to enable an MSC server select function, determining the destination MSC server of the message according to the ID information carried in the message if the determination is positive; and forwarding the received message to a respective MSC server directly according to the SCCP layer routing function if the determination is negative.

When the MSC server in the MSC pool establishes a signaling connection with the BSC/RNC through the use of a signaling point different from the common signaling point, the method further includes the following step before the MGW sends the received message to the destination MSC server: modifying, by the MGW, the destination signaling point carried in the received message, as the signaling point of the destination MSC server.

When the MSC server in the MSC pool establishes a signaling connection with the BSC/RNC through a signaling point different from the common signaling point, the method further includes the following step before the MGW sends the message from the MSC server to the BSC/RNC: modifying the source signaling point carried in the message, as the common signaling point.

An embodiment of the present invention provides a system for realizing a Mobile Switch Center (MSC) pool, including:

Base Station Controllers (BSCs)/Radio Network Controllers (RNCs);

Media Gateways (MGWs), connected to a BSC/RNC via a common signaling point; and

MSC servers, for implementing a full interconnection with the BSCs/RNCs via the MGWs.

Here, an MGW is configured to: receive a message from a BSC/RNC, upon receipt of a message whose destination signaling point is the common signaling point, determine a destination MSC server of the message according to ID information carried in the message, and send the received message to the destination MSC server.

The MSC server establishes a signaling connection with the BSC/RNC through the common signaling point or a signaling point different from the common signaling point, and the MGW provides a signaling point different from the common signaling point to connect with the MSC server.

When the MSC server establishes a signaling connection with the BSC/RNC through a signaling point different from the common signaling point, the MGW is further configured to modify the destination signaling point carried in a message whose destination signaling point is the common signaling point, as the signaling point of the destination MSC server.

When the MSC server establishes a signaling connection with the BSC/RNC through a signaling point different from the common signaling point, the MGW is further configured to: receive a message from the MSC server; modify a source signaling point carried in the message from the MSC server, as the common signaling point; and send the modified message to the BSC/RNC.

Furthermore, an embodiment of the present invention provides a Media Gateway (MGW), including a message reception unit and a message distribution unit.

The message reception unit is configured to receive a message from a BSC/RNC, and send the received message to the message distribution unit; and the message distribution unit is configured to receive a message whose destination signaling point is a common signaling point, determine a destination MSC server of the message according to ID information carried in the message, and send the received message to the destination MSC server.

The message distribution unit is further configured to modify the destination signaling point carried in the message whose destination signaling point is the common signaling point, as the signaling point of the destination MSC server.

The message reception unit is further configured to receive a message from the MSC server, and send the received message to the message distribution unit.

The message distribution unit is further configured to modify a source signaling point carried in the message received from the MSC server, as the common signaling point, and send the modified message to the BSC/RNC.

Thus, it can be seen that in embodiments of the present invention that, MGWs use a same signaling point to connect with a BSC/RNC. The BSC/RNC regards this signaling point as the signaling point of the MSC server and only connects with this signaling point. In this manner, the BSC/RNC is not aware of the difference between various MSC servers. To the BSC/RNC, all MSC servers in the MSC pool appear to be the same MSC server. Additionally, the function of distributing the subscriber traffic load is moved to the MGW from the BSC/RNC according to the invention. As a result, there is no need to upgrade the BSC/RNCs in the current networks. The networking scheme of the MSC pool may be implemented without making modifications to the BSC/RNCs in the current networks. The flexibility of the networking scheme for mobile communication networks may be improved, the network load may be shared among multiple MSC servers, and the subscriber roaming signaling between MSC servers may be reduced. Problems caused by the configuration of the conventional mobile communication systems, for example, complicated network plan and increase in the investment costs of the network devices, may be avoided.

DETAILED DESCRIPTION

The objects, technical solutions and advantages of the present invention will become more apparent from the detailed description set forth below in conjunction with the specific embodiments and the drawings.

To address the problems caused by conventional practices, the embodiments of the invention provide a solution mainly for the configuration of an MSC pool in which the carrying function and the controlling function are separated. With this solution, the networking scheme for an MSC pool may be implemented without upgrading the BSCs/RNCs.

In embodiments of the invention, an MGW connects with a BSC/RNC through a same signaling point (referred to as common signaling point). As used in the application, the term "signaling point" may refer to a signaling point device or the code for a signaling point device. The BSC/RNC regards this common signaling point as the signaling point of the MSC server and only connects with this common signaling point. In this manner, a BSC/RNC is not aware of the difference between various MSC servers. To a BSC/RNC, all MSC servers in the MSC pool appear to be the same MSC server. The destination signaling point carried in an uplink message sent from the BSC/RNC is the common signaling point, and upon receipt of a message whose destination signaling point is the common signaling point, the MGW determines the destination MSC server according to ID information (such as subscriber ID or MSC server ID) carried in the message, and sends the received message to the destination MSC server. In other words, the function of distributing traffic load is moved to the MGW from the BSC/RNC. As a result, there is no need to upgrade any BSC/RNC.

Here, a BSC/RNC may be connected to one or more MGWs, and, a full interconnection between the BSCs/RNCs and all MSC servers in the MSC pool may be implemented by connecting the MGWs and the MSC servers in the MSC pool.

Figure 5:
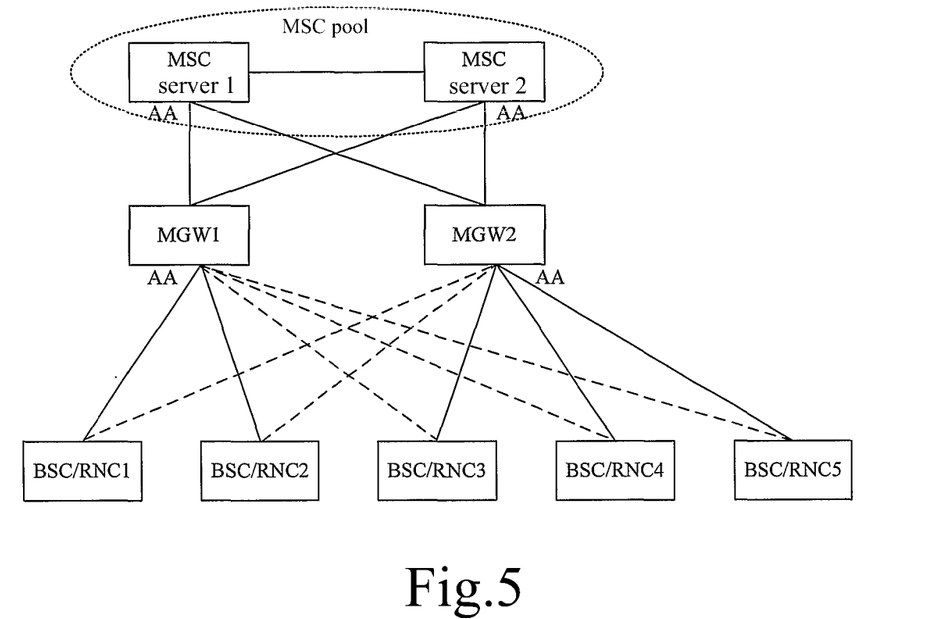
FIG. 5 shows the configuration of an MSC pool according to an embodiment of the present invention.
Figure 6:
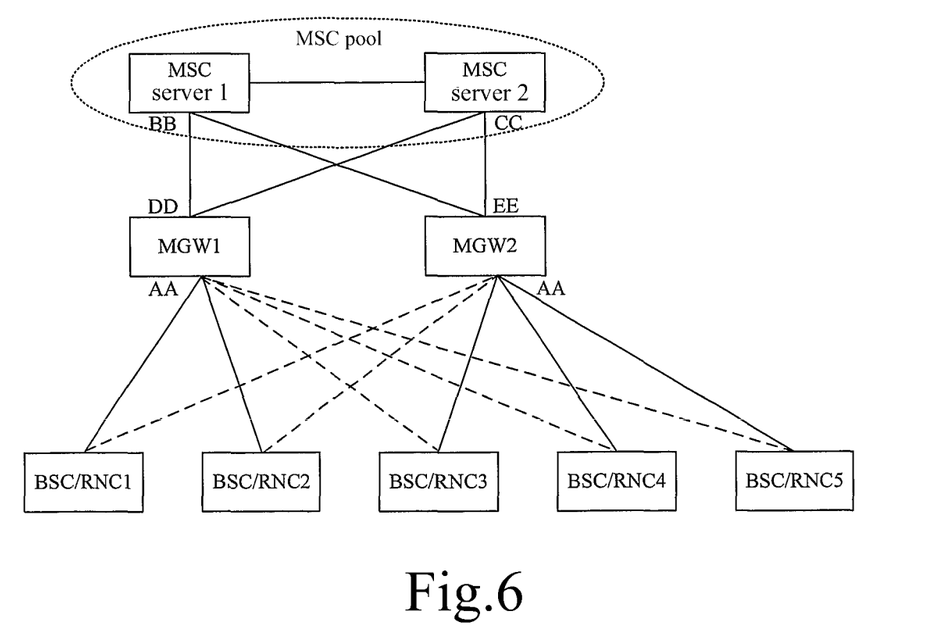
FIG. 6 shows the configuration of another MSC pool according to an embodiment of the present invention.

For the MSC servers in the MSC pool, they may access a same BSC/RNC through a signaling point which is the same as the common signaling point, or a signaling point different from the common signaling point (but in this case, the MGWs have to provide signaling points different from the common signaling point to connect with the MSC servers). For example, as shown in FIG. 5, each MSC server and each MGW in the MSC pool use a signaling point AA to establish a signaling connection with the BSCs/RNCs. Alternatively, as shown in FIG. 6, each MGW in the MSC pool uses a signaling point AA to establish a signaling connection with the BSCs/RNCs, but the MSC servers in the MSC pool use signaling points different from AA to connect the BSCs/RNCs. As shown in FIG. 6, MSC server 1 uses a signaling point BB to connect the BSCs/RNCs, and MSC server 2 uses a signaling point CC to connect the BSCs/RNCs. MGW1 uses a signaling point DD to connect MSC server 1 and MSC server 2, and MGW2 uses a signaling point EE to connect MSC server 1 and MSC server 2. In the two cases, the BSCs/RNCs consider the signaling point AA as the only signaling point to connect them to the MSC servers.

Figure 7:
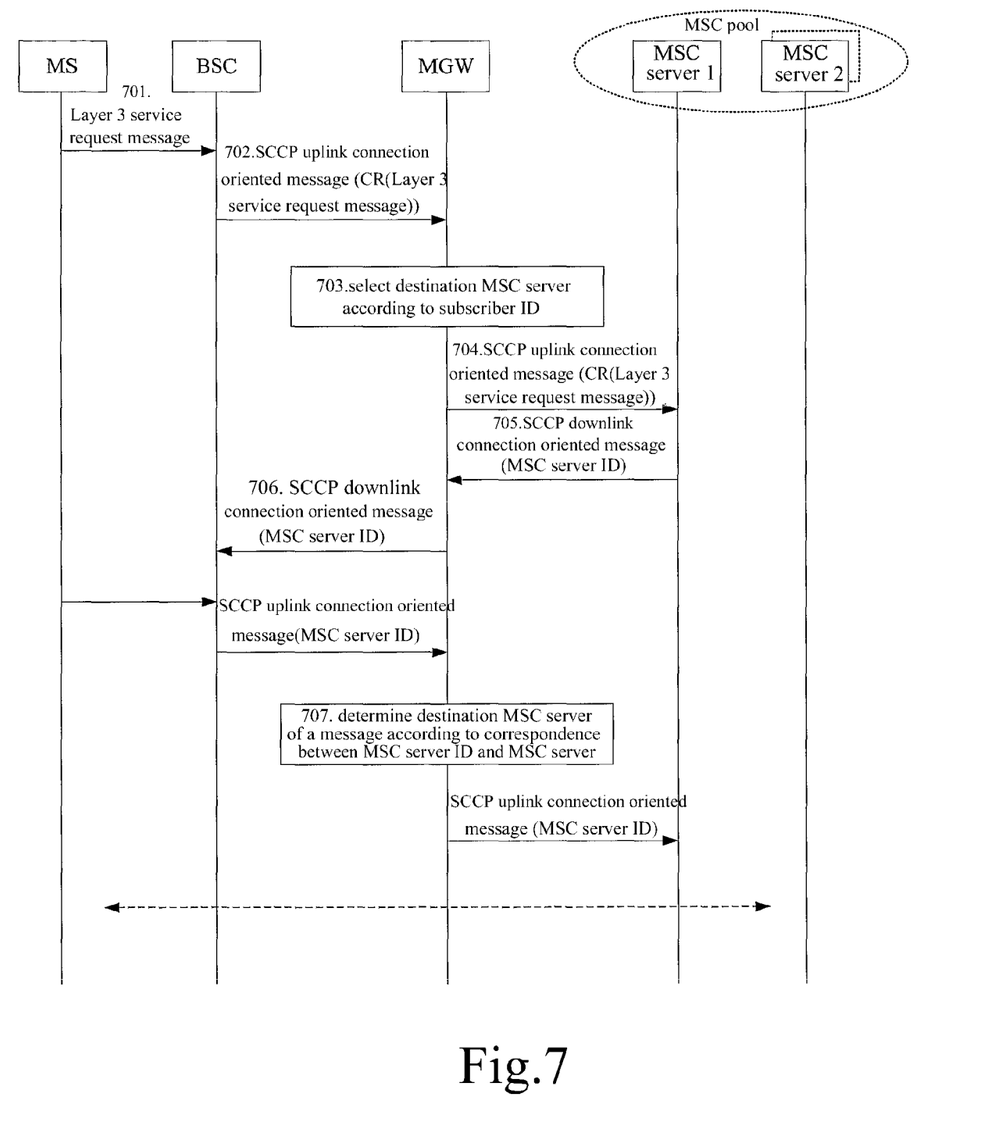
FIG. 7 is a flow chart showing an MGW's service processing according to an embodiment of the present invention.

Detailed description will be made below to the process for the MGW to process services in an example in which the access network device is a BSC. As shown in FIG. 7, the process mainly includes the following steps.

Step 701: An MS sends a Layer 3 service request message to a BSC.

Step 702: The BSC forwards the received Layer 3 service request message to the MGW, the destination signaling point carried in the message sent to the MGW being the common signaling point of the MGW.

Step 703: Upon receipt of the message sent from the BSC, the MGW parses the Signaling Connection Control Protocol (SCCP) message therein. If the received message is a Connection Request (CR) message in the SCCP uplink connection oriented message, the Layer 3 service request message is parsed and the destination MSC server is selected according to a subscriber ID in the Layer 3 service request message.

If the received message is an SCCP uplink connectionless message, the MGW may select one MSC server from the MSC pool randomly as the destination MSC server of the message, or forwards the received message to all MSC servers in the MSC pool, or simply discards the message.

In Step 703, the process for the MGW to select the destination MSC server may involve the following cases.

1) When the subscriber ID is a Temporary Mobile Subscriber ID (TMSI), the MGW extracts a Network Resource Indication (NRI) from the TMSI, looks up the correspondence relationship table between NRI and MSC server, and determines the destination MSC server of the message according to a correspondence relationship between the NRI and an MSC server.

2) When the Layer 3 service request message is a paging response message and the subscriber ID is an International Mobile Subscriber ID (IMSI), the MGW looks up the temporarily saved correspondence relationship between the IMSI and an MSC server, and determines the destination MSC server of the message according to the correspondence relationship between the IMSI and an MSC server.

If the MGW itself fails to obtain the correspondence relationship between the IMSI and the MSC server, the MGW may inquire each MSC server in the MSC pool for an MSC server in which the subscriber resides, by taking the IMSI as the parameter via a message (for example, BSSAP, RANAP, or H.248 message), and use the inquired MSC server as the destination MSC server.

If the destination MSC server cannot be determined by inquiring MSC servers, the process proceeds to 3).

3) When the subscriber ID is an IMSI or International Mobile Equipment ID (IMEI), the MGW computes a value V, inquires the correspondence relationship between the value V and an MSC server, and determines the destination MSC server of the message according to the correspondence relationship between the value V and an MSC server. Here, v=(IMSI/IMEI div 10) mod 1000.

Step 704: The MGW sends the message from the BSC to the destination MSC server.

In FIG. 7, the destination MSC server is supposed to be MSC server 1.

If the destination MSC server does not use the common signaling point, the MGW modifies the destination signaling point in the message destined for the destination MSC server, as the signaling point of the destination MSC server.

Step 705: The MSC server carries a home MSC server ID in an SCCP downlink connection oriented message, and sends the SCCP downlink connection oriented message carrying the home MSC server ID to the MGW.

Here, some bits in the source SCCP connection number of the SCCP layer message may be reserved for saving the MSC server ID. The MSC server may send the MSC server ID, which is carried in the source SCCP connection number, to the MGW. As for the value of the MSC server ID and which bits in the SCCP connection number are occupied by the MSC server ID, it may be determined from the data configuration.

Step 706: Upon receipt of a message sent from the MSC server, the MGW parses an SCCP layer message therein. If the received message is an SCCP downlink connection oriented message, no special processing is performed, and the received message is forwarded to the BSC directly.

If the received message is an SCCP downlink connectionless message, the MGW parses the Layer 3 message therein. If the Layer 3 message is a paging message and its subscriber ID is an IMSI, the MGW saves the correspondence relationship between the IMSI and the MSC server temporarily. In this manner, when the MGW receives a paging response message from the MS and the subscriber ID is an IMSI, the MGW may route the paging response to the MSC server that initiates the paging according to a correspondence relationship between the IMSI and the MSC server.

If the MSC server does not use the common signaling point, the source signaling point carried in the message sent from the MSC server to the MGW will be different from the common signaling point, and thus the MGW modifies the source signaling point in the message as the signaling point, and then forwards the message to the BSC.

Step 707: Upon receipt of a message from the BSC, the MGW parses the SCCP layer message therein. If the message is a non-CR message in SCCP uplink connection oriented messages, an MSC server ID is parsed from a destination SCCP connection number of the message, a correspondence relationship between the MSC server ID and an MSC server is inquired, the destination MSC server of the message is determined according to the correspondence relationship between the MSC server ID and the MSC server, and then, the message from the BSC is forwarded to the destination MSC server.

If the destination MSC server does not use the common signaling point, the MGW modifies the destination signaling point in the message as the signaling point of the destination MSC server, and then forwards the message to the destination MSC server.

In Step 705, the MSC server carries a home MSC server ID in the source SCCP connection number of the message of an SCCP downlink connection oriented message. Upon receipt of the SCCP downlink connection oriented message carrying the MSC server ID, if the BSC is to send a message to the MSC server, it will also carry the MSC server ID in the destination SCCP connection number of the message. In this manner, when the MGW receives another non-CR message from the BSC next time, it may parse an MSC server ID from the destination SCCP connection number of the message, and then determine the destination MSC server of the message.

Moreover, it should be noted that the technique for realizing an MSC pool as provided in the invention may be combined with existing techniques for realizing an MSC pool.

Specifically, various MSC servers in an MSC pool may employ a multi-signaling point technique. They may access conventional BSCs/RNCs by using the technique of the invention, or access BSCs/RNCs having the function of an MSC pool as provided in the 3GPP 23.236 protocol by using other different signaling points. Also in the invention, an MSC server may connect with conventional MGWs, as well as conventional BSCs/RNCs. Here, a conventional MGW refers to a MGW that does not support the present invention, whereas a conventional BSC/RNC refers to a BSC/RNC that does not support the function of an MSC pool as provided in the 3GPP 23.236 protocol.

Figure 8:
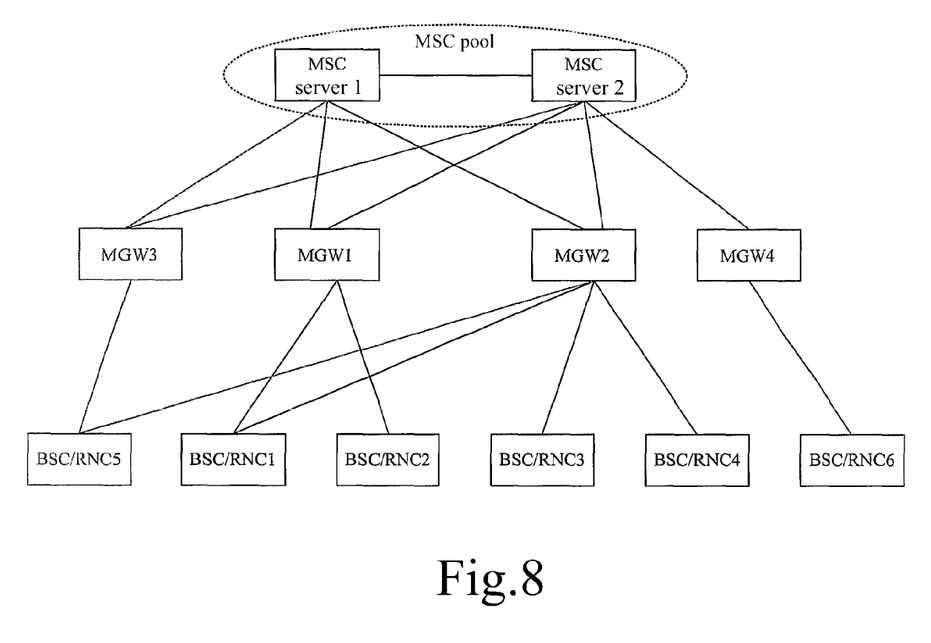
FIG. 8 shows the configuration of a mobile communication network according to an embodiment of the present invention.

For example, as shown in FIG. 8, through the signaling point AA, both MSC server 1 and MSC server 2 are connected to four conventional BSCs/RNCs: BSC/RNC1, BSC/RNC2, BSC/RNC3 and BSC/RNC4. After MGW1 or MGW2 receives a message from BSC/RNC1, BSC/RNC2, BSC/RNC3 and BSC/RNC4, the destination MSC server of a message destined for the same signaling point may be determined according to the subscriber ID or MSC server ID carried in the message, and the received message is then sent to the destination MSC server.

Meanwhile, MSC server 1 and MSC server 2 may be connected to BSC/RNC5 that supports the MSC pool function through signaling points other than AA, and the signaling points used by MSC server 1 and MSC server 2 are different from each other. For example, MSC server 1 uses the signaling point FF to connect with BSC/RNC5 via MGW3, and MSC server 2 uses the signaling point GG to connect with BSC/RNC5 via MGW3. Upon receipt of a message from the MS, BSC/RNC5 determines the destination signaling point of the message, and carries the signaling point in the received message which is sent to MGW3. Upon receipt of a message sent from BSC/RNC5, MGW3 sends the received message to the MSC server corresponding to the signaling point carried in the message. In this case, MGW3 may be conventional MGW, that is, having no function as the MGW as set forth in the invention.

Moreover, an MSC server in the MSC pool may be connected with conventional BSCs/RNCs through a conventional networking scheme. For example, BSC/RNC6 in FIG. 8 is connected to only one MSC server via MGW4. Upon receipt of a message from the MS, BSC/RNC6 directly sends the received message to the only connected MSC server 2 via MGW4.

If an MGW is connected to both a BSC/RNC that supports the MSC pool function and a conventional BSC/RNC, a list of BSCs/RNCs to enable the MSC server select function is configured on the MGW. After an MGW receives a message from a BSC/RNC, the MGW determines whether the BSC/RNC corresponding to the source signaling point carried in the message needs to enable the MSC server select function, by looking up the configured list. If the determination is positive, the MGW selects the destination MSC server of the message according to the subscriber ID or MSC server ID carried in the message, and sends the received message to the destination MSC server. If the determination is negative, the MGW does not parse the SCCP layer and upper layer messages, but forwards the received message to a respective MSC server directly according to the SCCP lower layer routing function. In this manner, the load of the MGWs may be reduced.

Figure 9:
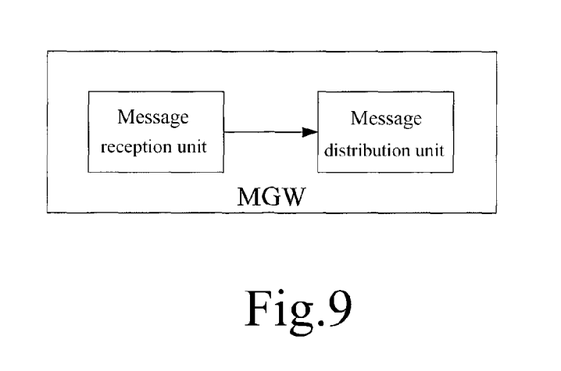
FIG. 9 shows the configuration of an MGW according to an embodiment of the present invention.

Accordingly, the invention also provides an MGW, whose configuration is shown in FIG. 9. The MGW mainly includes a message reception unit and a message distribution unit. The message reception unit is configured to receive a message from a BSC/RNC, and send the received message to the message distribution unit; and the message distribution unit is configured to receive a message whose destination signaling point is a common signaling point, determine a destination MSC server of the message according to ID information carried in the message, and send the received message to the destination MSC server.

The message distribution unit is further configured to modify the destination signaling point carried in the message whose destination signaling point is the common signaling point, as the signaling point of the destination MSC server.

The message reception unit is further configured to receive a message from the MSC server, and send the received message to the message distribution unit. The message distribution unit is further configured to modify a source signaling point carried in the message received from the MSC server, as the common signaling point, and send the modified message to the BSC/RNC.

Finally, it should be noted that the present invention may be applied to various mobile communication systems, such as a Global System for Mobile communications (GSM), a Code Division Multiple Access (CDMA) system, and a Wideband Code Division Multiple Access (WCDMA) system.

While detailed descriptions have been made to the objects, technical solutions and advantages of the present invention, it shall be noted that they are not used to limit the scope of the invention. According to the disclosure of the invention, various changes, substitutions and modifications conceivable to those skilled in the art fall within the scope of the invention.

What is claimed is:

1. A method for selecting a Mobile Switch Center (MSC) server by a first Media Gateway (MGW) coupled to a plurality of MSC servers, comprising:
   receiving a message in which a destination signaling point is a common signaling point from a Base Station Controller (BSC) or Radio Network Controller (RNC), wherein the first MGW is connected to the BSC or RNC via the common signaling point through which a second MGW is connected to the BSC or RNC, and wherein the message is a Layer 3 message;
   upon receipt of the message from the BSC or RNC, determining a destination MSC server among the plurality of MSC servers according to identification (ID) information carried in the message;
   sending the received message to the destination MSC server over a Mc interface between the first MGW and the destination MSC server,
   wherein the method further comprises:
      upon receipt of a message sent from one of the plurality of MSC servers, parsing a signaling connection control protocol (SCCP) layer message therein,
      if the received message from the MSC server is an SCCP downlink connection oriented message, forwarding the received message from the MSC server to the BSC or RNC;
      if the received message from the MSC server is an SCCP downlink connectionless message, parsing a Layer 3 message therein, and if the Layer 3 message in the received message from the MSC server is a paging message and its subscriber ID is an international mobile subscriber ID (IMSI), saving a correspondence relationship between the IMSI and the MSC server which sends the message, and forwarding the received message from the MSC server to the BSC or RNC.

2. A method for selecting a Mobile Switch Center (MSC) server by a first Media Gateway (MGW) coupled to a plurality of MSC servers, comprising:
   receiving a message in which a destination signaling point is a common signaling point from a Base Station Controller (BSC) or Radio Network Controller (RNC), wherein the first MGW is connected to the BSC or RNC via the common signaling point through which a second MGW is connected to the BSC or RNC, and wherein the message is a Layer 3 message;
   upon receipt of the message from the BSC or RNC, determining a destination MSC server among the plurality of MSC servers according to identification (ID) information carried in the message;
   sending the received message to the destination MSC server over a Mc interface between the first MGW and the destination MSC server;
   wherein before the first MGW determines the destination MSC server according to the ID information carried in the message, the method further comprises:
      determining whether a BSC or RNC corresponding to a source signaling point carried in the message is a BSC or RNC which needs to enable an MSC server select function;
      determining the destination MSC server according to the ID information carried in the message if the BSC or RNC corresponding to the source signaling point carried in the message is the BSC or RNC which needs to enable the MSC server select function; and forwarding the received message to a respective MSC server directly according to a signaling connection control protocol (SCCP) layer routing function if the BSC or RNC corresponding to the source signaling point carried in the message is not the BSC or RNC which needs to enable the MSC server select function.

3. The method according to claim 1, wherein when each MSC server of the plurality of MSC servers establishes a signaling connection with the BSC or RNC through a signaling point different from the common signaling point, before the first MGW sends the received message to the destination MSC server the method further comprises:

modifying the destination signaling point carried in the received message into a signaling point of the destination MSC server.

4. The method according to claim 1, wherein when each MSC server of the plurality of MSC servers establishes a signaling connection with the BSC or RNC through a signaling point different from the common signaling point, before the first MGW sends the message from the MSC server to the BSC or RNC the method further comprises:

modifying a source signaling point carried in the message into the common signaling point.

5. A system, comprising:

a media gateway (MGW) configured to communicate with a base station controller (BSC) or radio network controller (RNC) via a common signaling point through which another MGW communicates with the BSC or RNC;

a plurality of MSC servers each of which is coupled to the MGW over a Mc interface; and wherein the MGW is configured to:

receive a message from the BSC or RNC in which a destination signaling point is the common signaling point, wherein the message is a Layer 3 message, upon receipt of the message, determine a destination MSC server according to identification (ID) information carried in the message, and send the received message to the destination MSC server, receive a message sent from one of the plurality of MSC servers, and parse a signaling connection control protocol (SCCP) layer message therein, if the received message from the MSC server is an SCCP downlink connection oriented message, forward the received message from the MSC server to the BSC or RNC, if the received message from the MSC server is an SCCP downlink connectionless message, parsing a Layer 3 message therein, and if the Layer 3 message in the received message from the MSC server is a paging message and its subscriber ID is an international mobile subscriber ID (IMSI), saving a correspondence relationship between the IMSI and the MSC server which sends the message temporarily, and forwarding the received message from the MSC server to the BSC or RNC.

6. The system according to claim 5, wherein when each of the plurality of MSC servers establishes a signaling connection with the BSC or RNC through a signaling point different from the common signaling point, the MGW is further configured to modify the destination signaling point carried in the message into a signaling point of the destination MSC server.

7. The system according to claim 5, wherein when each of the plurality of MSC servers establishes a signaling connection with the BSC or RNC through a signaling point different from the common signaling point, the MGW is further configured to:

receive a message from one of the plurality of MSC servers;

modify a source signaling point carried in the message from the MSC server into the common signaling point; and send the modified message to the BSC or RNC.

8. A media gateway (MGW) which is operable to connect with a base station controller (BSC) or radio network controller (RNC) through a common signaling point, the MGW comprising:

receiver configured to receive a message in which a destination signaling point is the common signaling point from the BSC or RNC, wherein the message is a Layer 3 message;

a processor coupled to the receiver and configured to receive the message from the receiver, determine a destination MSC server among a plurality of MSC servers according to identification (ID) information carried in the message and send the message to the destination MSC server, and to modify the destination signaling point carried in the message into a signaling point of the destination MSC server, wherein the MGW is connected with each of the plurality of MSC servers over a Mc interface, wherein the receiver is configured to receive a message sent from one of the plurality of MSC servers, wherein the processor is configured to:

if the received message from the MSC server is a signaling connection control protocol (SCCP) downlink connection oriented message, forward the received message from the MSC server to the BSC or RNC, if the received message from the MSC server is an SCCP downlink connectionless message, parse a Layer 3 message therein, and if the Layer 3 message in the received message from the MSC server is a paging message and its subscriber ID is an international mobile subscriber ID (IMSI), save a correspondence relationship between the IMSI and the MSC server which sends the message temporarily, and forward the received message from the MSC server to the BSC or RNC.

9. The method according to claim 1, wherein the destination MSC server establishes a signaling connection with the BSC or RNC through the common signaling point; or the destination MSC server establishes a signaling connection with the BSC or RNC through a signaling point different from the common signaling point, and the first MGW provides another signaling point different from the common signaling point to connect with the destination MSC server.

10. The method according to claim 1, wherein the first MGW connects with the plurality of MSC servers through a signaling point which is different from the common signaling point.

11. The system according to claim 5, wherein the destination MSC server establishes a signaling connection with the BSC or RNC through the common signaling point; or the destination MSC server establishes a signaling connection with the BSC or RNC through a signaling point different from the common signaling point, and the MGW provides a signaling point different from the common signaling point to connect with the destination MSC server.

12. The system according to claim 5, wherein the MGW connects with the plurality of MSC servers through a signaling point which is different from the common signaling point.

13. The MGW according to claim 8, wherein the MGW connects with the plurality of MSC servers through a signaling point which is different from the common signaling point.

* * * * *